United States Patent
Gillespie, II et al.

(10) Patent No.: US 10,408,022 B2
(45) Date of Patent: Sep. 10, 2019

(54) ENHANCED EROSION RESISTANCE WIRE SHAPES

(71) Applicant: Weatherford Technology Holdings, LLC, Houston, TX (US)

(72) Inventors: George Alexander Gillespie, II, Brandenton, FL (US); John Steven Sladic, Katy, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 573 days.

(21) Appl. No.: 14/875,825

(22) Filed: Oct. 6, 2015

(65) Prior Publication Data
US 2016/0102532 A1    Apr. 14, 2016

Related U.S. Application Data

(60) Provisional application No. 62/062,017, filed on Oct. 9, 2014.

(51) Int. Cl.
| | |
|---|---|
| *E21B 34/12* | (2006.01) |
| *E21B 43/08* | (2006.01) |
| *B01D 29/48* | (2006.01) |
| *E21B 34/00* | (2006.01) |

(52) U.S. Cl.
CPC ............ *E21B 43/088* (2013.01); *B01D 29/48* (2013.01); *E21B 34/12* (2013.01); *E21B 2034/007* (2013.01)

(58) Field of Classification Search
CPC ................................. E21B 43/088; E21B 37/12
See application file for complete search history.

(56) References Cited

U.S. PATENT DOCUMENTS

| | | | |
|---|---|---|---|
| 4,193,503 A | 3/1980 | Connolly | |
| 5,011,065 A * | 4/1991 | Musselmann | B01D 29/111 209/411 |
| 5,090,721 A | 2/1992 | Lange | |
| 5,476,143 A | 12/1995 | Sparlin et al. | |
| 5,868,200 A | 2/1999 | Bryant et al. | |
| 6,125,932 A * | 10/2000 | Hamid | E21B 43/082 166/233 |
| 6,595,373 B1 | 7/2003 | Seifert | |

(Continued)

FOREIGN PATENT DOCUMENTS

| | | |
|---|---|---|
| DE | 102013105464 A1 | 12/2013 |
| GB | 2371319 A | 7/2002 |

(Continued)

OTHER PUBLICATIONS

Canadian Office Action dated Sep. 21, 2016, for Canadian Patent Application No. 2,908,009.

(Continued)

*Primary Examiner* — David J Bagnell
*Assistant Examiner* — Brandon M Duck
(74) *Attorney, Agent, or Firm* — Patterson + Sheridan, LLP (57) ABSTRACT

A filter assembly comprising a tubular member, one or more support members disposed on the tubular member, and a wire disposed on the support members. One or more spaces are formed between adjacent portions of the wire. The wire includes a wire shape having substantially flat side surfaces such that an elongated channel is formed between adjacent wire shapes.

20 Claims, 5 Drawing Sheets

(56) References Cited

U.S. PATENT DOCUMENTS

| | | |
|---|---|---|
| 7,954,546 B2 | 6/2011 | Kim et al. |
| 8,511,380 B2 | 8/2013 | Guignard et al. |
| 2002/0079099 A1 | 6/2002 | Hurst et al. |
| 2003/0173075 A1 | 9/2003 | Morvant et al. |
| 2009/0095471 A1 | 4/2009 | Guignard et al. |
| 2009/0133874 A1 | 5/2009 | Dale et al. |
| 2011/0002410 A1 | 1/2011 | Forenza et al. |
| 2011/0220347 A1 | 9/2011 | Kayser |
| 2011/0303420 A1 | 12/2011 | Thorkildsen et al. |
| 2012/0018146 A1 | 1/2012 | Wildhack et al. |
| 2015/0013966 A1* | 1/2015 | O'Brien ................ E21B 43/088 166/228 |
| 2017/0074077 A1 | 3/2017 | Bowen et al. |
| 2017/0211361 A1* | 7/2017 | Reid ....................... E21B 43/08 |
| 2018/0320486 A1 | 11/2018 | Reid et al. |

FOREIGN PATENT DOCUMENTS

| | | |
|---|---|---|
| WO | 2003064811 A2 | 8/2003 |
| WO | 2004099560 A1 | 11/2004 |
| WO | 2007092082 A2 | 8/2007 |
| WO | 2015006013 A1 | 1/2015 |
| WO | 2016018821 A1 | 2/2016 |

OTHER PUBLICATIONS

Canadian Office Action dated May 1, 2017, for Canadian Patent Application No. 2,908,009.
European Office Action dated Jan. 5, 2016, in corresponding application No. 15188774.2.
EPO Office Action dated Mar. 29, 2019, for European Patent Application No. 15188774.2.

* cited by examiner

ENHANCED EROSION RESISTANCE WIRE SHAPES

CROSS REFERENCE TO RELATED APPLICATION

This application claims benefit of U.S. Provisional Application Ser. No. 62/062,017, filed Oct. 9, 2014, the contents of which are herein incorporated by reference in their entirety.

BACKGROUND

Field of the Disclosure

Embodiments of this disclosure generally relate to enhanced erosion resistant wire shapes for a filter assembly used to filter fluid flow in wellbore operations.

Description of the Related Art

A filter assembly, such as a sand screen, is used to filter out solid particles, such as sand, from hydrocarbons recovered from underground reservoirs. The filter assembly is placed in either a cased wellbore or an open-hole wellbore. In the cased wellbore, casing is placed in the wellbore and perforations are made through the casing into the reservoir to provide a flow path for fluids within the reservoir, such as hydrocarbons, to flow into the wellbore. Alternatively, in an open-hole wellbore, a production string is positioned inside the wellbore without casing. The reservoir fluids flow through the annulus between the reservoir and the production string to enter the production string.

Solid particles, such as sand, can be produced along with the reservoir fluids because the reservoirs are poorly consolidated or weakened by wellbore excavation and fluid withdrawal. The production of large solid particles can cause erosion and other damage to downhole and surface equipment. The filter assembly retains larger sized solid particles but allows reservoir fluids and smaller sized solid particles to be produced. The filter assembly itself is susceptible to plugging by the larger sized solid particles and to erosion by the smaller sized solid particles. In open-hole completions, excessive velocity through the openings in the filter assembly may result in reduced service due to smaller sized solid particles, also referred to as "fines," that are able to flow through the filter assembly and are produced over the life of the well. Prior to production of the reservoir fluids, however, another risk for erosion is at the top of a filter assembly, such as a sand screen, near the end of a high rate gravel packing or frac packing completion, due to the high rate of fluid returns taken in through the sand screen.

Therefore, there is a continuous need for new and improved filter assemblies for wellbore operations.

SUMMARY

A filter assembly comprising a tubular member; one or more support members disposed on the tubular member; and a wire disposed on the support members such that one or more spaces are formed between adjacent portions of the wire, wherein the wire includes a wire shape having substantially flat side surfaces such that an elongated channel is formed between adjacent wire shapes, and wherein the wire shape includes two tapered or curved lower surfaces such that adjacent wire shapes form a funnel shape transitioning out of the elongated channel.

BRIEF DESCRIPTION OF THE DRAWINGS

So that the manner in which the above recited features can be understood in detail, a more particular description of the embodiments briefly summarized above may be had by reference to the embodiments below, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

In the detailed description, relative terms such as "horizontal," "vertical," "top," "bottom," and "side" refer to the orientation as shown in the drawing figure(s) under discussion. It is understood that the embodiments described herein and shown in the drawings figures can be oriented and/or viewed from other angles.

Figure 1:
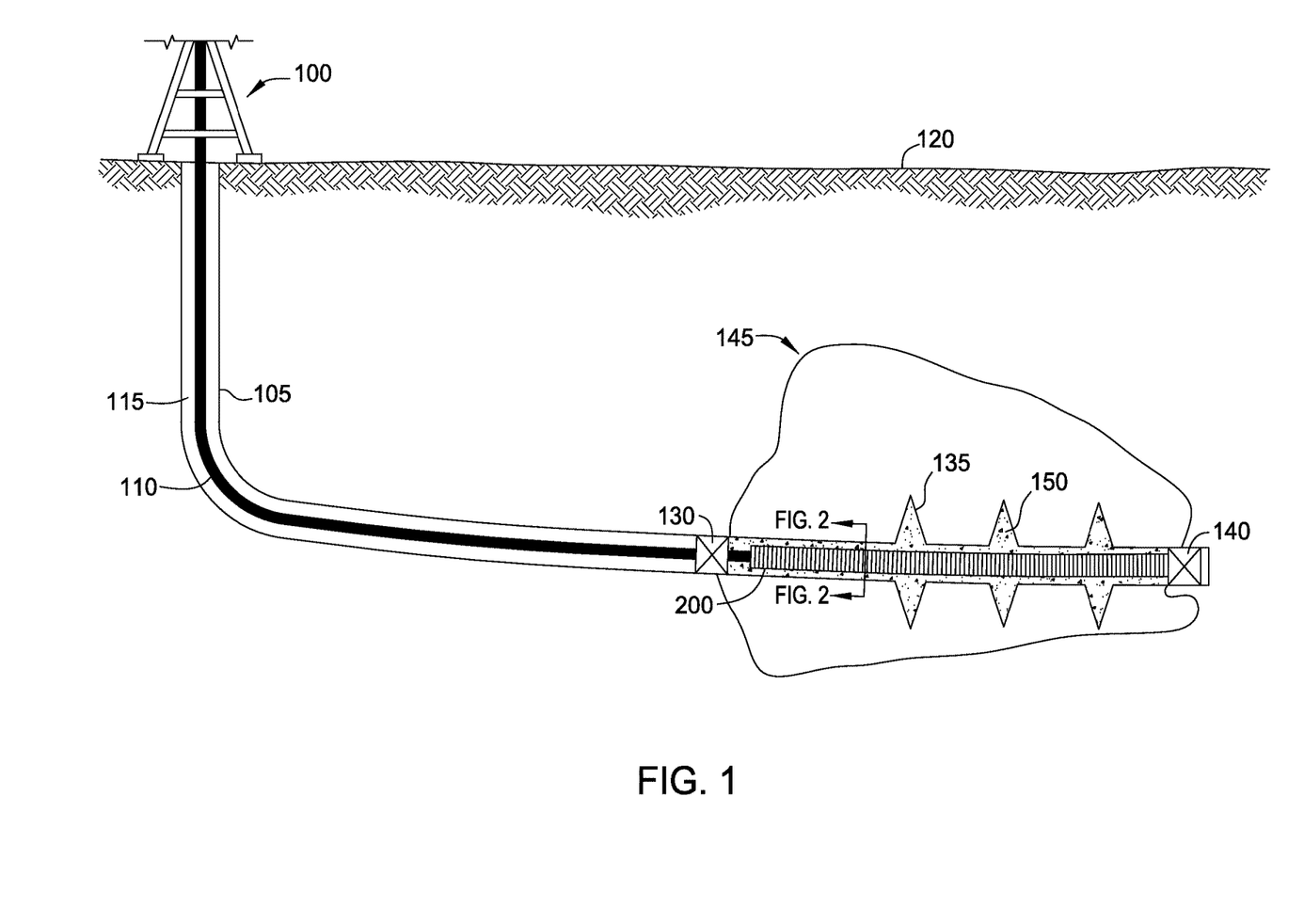
FIG. 1 illustrates a wellbore system, according to one embodiment disclosed herein.

FIG. 1 illustrates a wellbore system comprising a rig structure 100 for supporting a work string 110 that extends into a wellbore 115. The wellbore 115 is drilled from the surface 120 into the ground to recover hydrocarbons, such as oil and gas, and other fluids from a reservoir 145. The wellbore 115 is lined with casing 105, which is cemented within the wellbore 115 to structurally support the walls of the wellbore 115. Alternatively, the wellbore 115 can be an open hole wellbore that is not lined with casing 105.

A filter assembly 200 is coupled to the work string 110 and is used to filter out large solid particles, such as sand, from the fluids recovered from the reservoir 145. The bore of the work string 110 provides a flow path to the surface 120 through which the fluids from the reservoir 145 can be produced. A first sealing member 130 and a second sealing member 140, such as packers, can be used at opposite ends of the filter assembly 200 to isolate the reservoir 145 from other reservoirs or sections of the wellbore 115, and direct the fluids into the filter assembly 200.

A gravel pack 150 is disposed within the annulus between the filter assembly 200 and the casing 105, as well as within areas 135 formed by perforating the casing 105 to allow fluids within the reservoir 145 to flow into the wellbore 115. The gravel pack 150, similar to the filter assembly 200, is used as an additional mechanism to filter out large solid particles from the fluids recovered from the reservoir 145. Fluids from the reservoir 145 flow through the gravel pack 150 into the wellbore 115, and then flow through the filter assembly 200 into the work string 110. When injecting the gravel pack 150 into the annulus between the filter assembly 200 and the casing 105, as well as within areas 135, the pumping rate at which the gravel pack 150 is injected has to be immediately reduced just prior to completely filling the annulus and the areas 135 with the gravel pack 150 to prevent significant erosion at the top or upper end of the filter assembly 200, due to the high rate of return fluids taken in through the filter assembly 200 near the end of the gravel packing process. However, attempting to reduce the pumping rate may result in the top or upper end of the filter assembly 200 being left without any gravel pack 150 surrounding the top or upper end of the filter assembly 200. This exposed area of the filter assembly 200 is more susceptible to erosion since there is no additional gravel pack 150 filtration of the fluids recovered from the reservoir 145. The embodiments disclosed herein help address this potential erosion issue.

Figure 2:
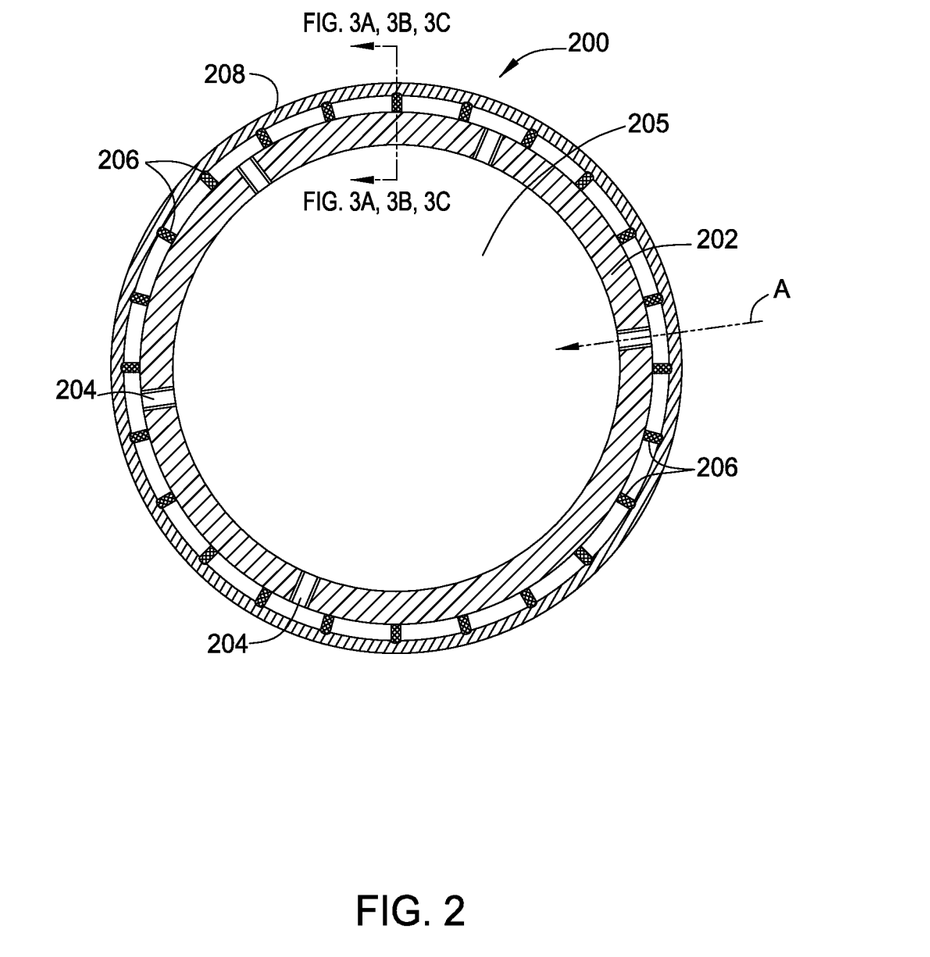
FIG. 2 illustrates a sectional view of a filter assembly, according to one embodiment disclosed herein.

FIG. 2 illustrates a sectional view of the filter assembly 200 according to one embodiment. The filter assembly 200 includes a continuous wire 208 spirally wrapped onto one or more support members 206, such as rods, which are disposed on the outer surface of a tubular member 202. The wire 208 may be coupled to the support members 206 by welding at each contact point. The support members 206 are spaced apart about the circumference of the tubular member 202 and disposed along the longitudinal length of the tubular member 202. The wire 208 is wound around the support members 206 to attain a desired spacing between adjacent portions of the wire 208.

The wire 208 and the support members 206 are slipped onto the tubular member 202, or alternatively, the wire 208 is wrapped directly onto the support members 206 after the support members 206 are coupled to the outer surface of the tubular member 202. The tubular member 202, such as a base pipe, has a bore 205 that is in fluid communication with the bore of the work string 110 illustrated in FIG. 1. One or more openings 204 are formed through the wall of the tubular member 202 about the circumference and along the longitudinal length of the tubular member 202 to provide flow paths from the exterior of the tubular member 202 into the bore 205 of the tubular member 202.

Fluids, identified by reference arrow "A", flow through the spaces formed between adjacent portions of the wire 208. Solid particles in the fluids that do not fit through the spaces formed between adjacent portions of the wire 208 are retained by the wire 208. The fluids then flow into the bore 205 of the tubular member 202 through the openings 204. The filter assembly 200 prevents solid particles of a specific size, such as solid particles greater than 30-50 microns, from flowing into the bore 205 of the tubular member 202 and flowing up through the work string 110, which can cause erosion or other damage to downhole and surface equipment.

Figure 3A:
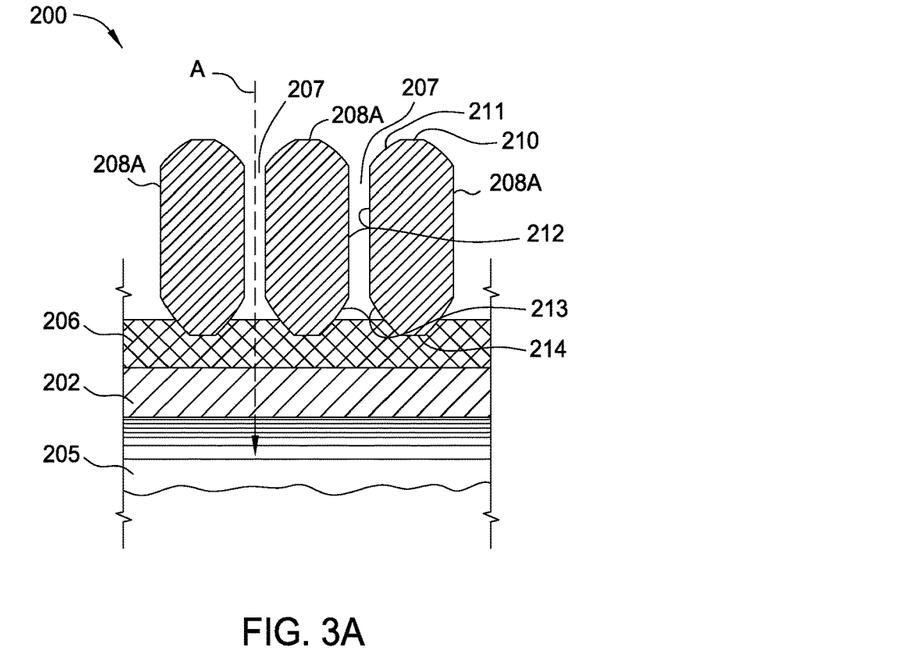
FIG. 3A illustrates an enlarged sectional view of a portion of the filter assembly having a first wire shape, according to one embodiment disclosed herein.
Figure 3B:
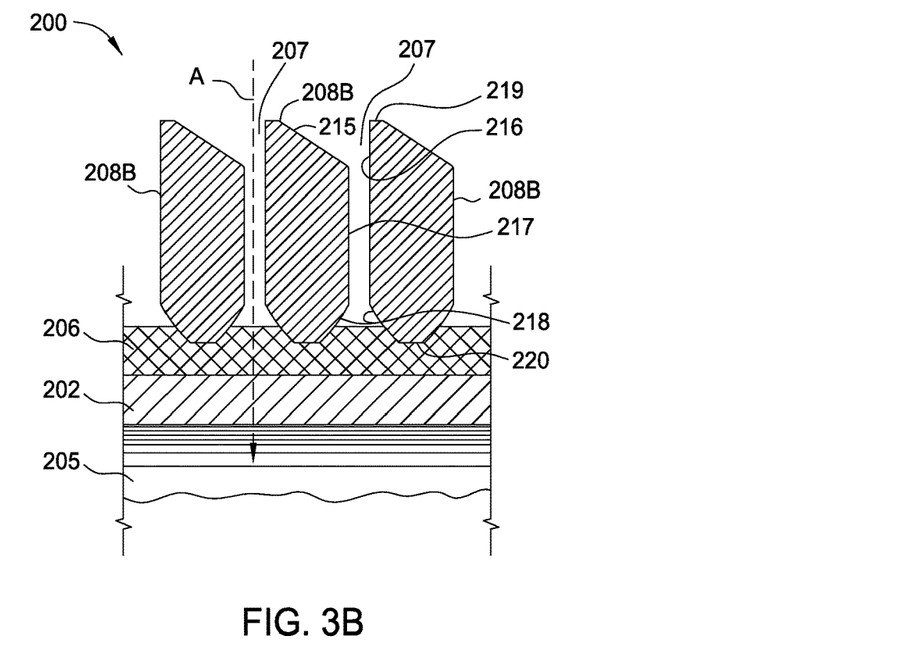
FIG. 3B illustrates an enlarged sectional view of a portion of the filter assembly having a second wire shape, according to one embodiment disclosed herein.
Figure 3C:
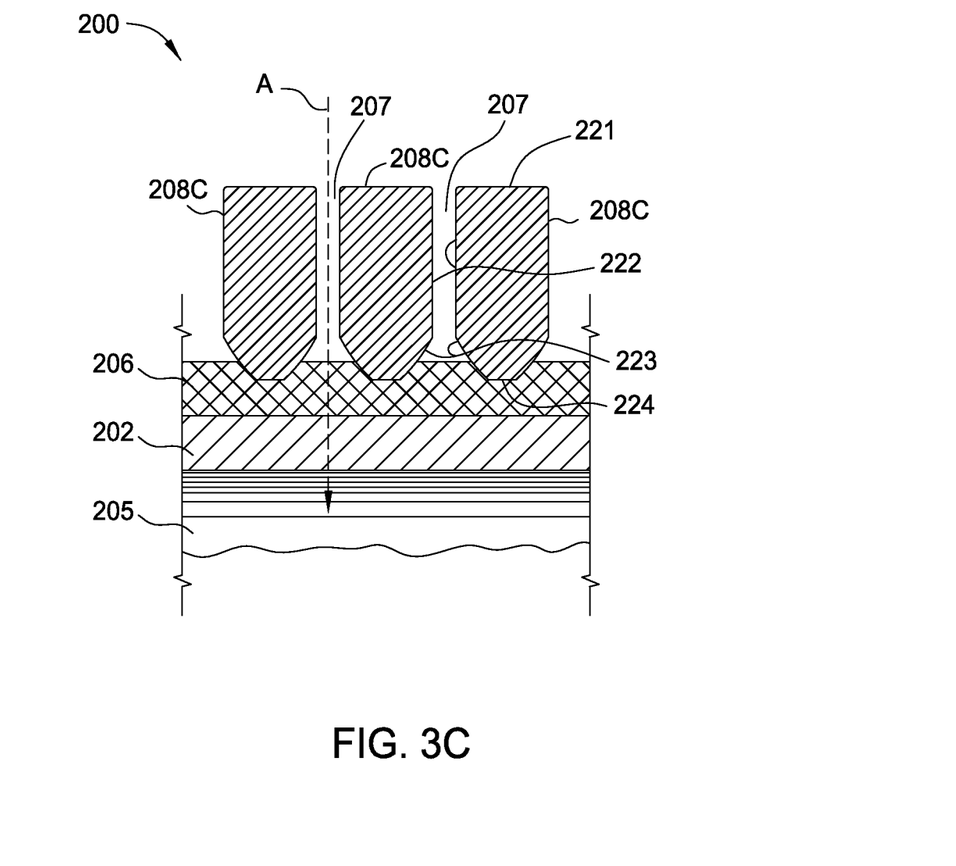
FIG. 3C illustrates an enlarged sectional view of a portion of the filter assembly having a third wire shape, according to one embodiment disclosed herein.

FIG. 3A illustrates an enlarged sectional view of a portion of the filter assembly 200 having a first wire shape 208A. FIG. 3B illustrates an enlarged sectional view of a portion of the filter assembly 200 having a second wire shape 208B. FIG. 3C illustrates an enlarged sectional view of a portion of the filter assembly 200 having a third wire shape 208C. The wire 208 having any of the first, second, or third shapes 208A, 208B, 208C, is wrapped around the support members 206 in a helical pattern such that one or more spaces 207 having a predetermined size and shape is formed between adjacent portions of the first, second, and third wire shapes 208A, 208B, 208C. The size and shape of the spaces 207 are formed by the spacing between adjacent portions of the wire 208, as well as by the first, second, and third wire shapes 208A, 208B, 208C.

Referring to FIG. 3A, the first wire shape 208A includes a substantially horizontal and flat top surface 210, a substantially horizontal and flat bottom surface 214, two tapered (e.g. curved or flat) upper surfaces 211 extending from the top surface 210, two tapered (e.g. curved or flat) lower surfaces 213 extending from the bottom surface 214, and two substantially vertical and flat side surfaces 212 disposed between the upper and lower surfaces 211, 213. The flat side surfaces 212 are disposed below the upper surfaces 211, and are disposed above the lower surfaces 213. The top surface 210 and the bottom surface 214 may have substantially the same length. The side surfaces 212 may have substantially the same length, and are longer in length than the tapered upper and lower surfaces 211, 213. The tapered upper and lower surfaces 211, 213 may have substantially the same length.

Fluid flowing into the filter assembly 200 identified by reference arrow "A" is funneled into the spaces 207 by a funnel shape formed by the converging tapered upper surfaces 211 of adjacent first wire shapes 208A that transitions into an elongated channel. The elongated channel has substantially the same width along substantially the entire length of the opposing side surfaces 212. The fluid then flows through an elongated channel formed by opposing side surfaces 212 on adjacent first wire shapes 208A. The fluid flow then exits the spaces 207 through an opposing funnel shape formed by the diverging tapered lower surfaces 213 of adjacent first wire shapes 208A transitioning out of the elongated channel. Although the fluid identified by reference arrow "A" is illustrated as flowing into the spaces 207 from the top down, such as during production, the fluid flow may be reversed such that fluid flows in the opposite direction from the bottom up through the filter assembly 200, such as during water or steam injection.

The side surfaces 212 have sufficient lengths to accommodate for erosion of the first wire shape 208A in the area where the upper surfaces 211 transition to the side surfaces 212 (as well as in the area where the lower surfaces 213 transition to the side surfaces 212), while maintaining the elongated channel formed between opposing side surfaces 212 on adjacent first wire shapes 208A of sufficient length to prevent larger sized solid particles from flowing through the spaces 207. The increased height of the first wire shape 208A also increases the collapse and burst resistance of the filter assembly 200. Another advantage of the first wire shape 208A is that the upper surfaces 211 that funnel the fluid flow into the spaces 207 reduce impingement (e.g. less turbulence and bounce effect) of smaller sized solid particles on the side surfaces 212 of the first wire shape 208A when flowing through the elongated channel formed by the side surfaces 212 of adjacent first wire shapes 208A. A further advantage of the first wire shape 208A is that the flat top and bottom surfaces 210, 214 provide flat surfaces that enhance ease of weldability during the fabrication process.

Referring to FIG. 3B, the second wire shape 208B includes a substantially horizontal and flat top surface 219, a substantially horizontal and flat bottom surface 220, only one tapered (e.g. curved or flat) upper surface 215 extending from the top surface 219, two tapered (e.g. curved or flat) lower surfaces 218 extending from the bottom surface 220, a substantially vertical and flat first side surface 216, and a substantially vertical and flat second side surface 217. The first side surface 216 transitions from the top surface 219 to one of the lower surfaces 218. The second side surface 217 transitions from the upper surface 215 to the other one of the lower surfaces 218. The first and second side surfaces 216, 217 are disposed above the lower surfaces 218.

The length of the first side surface 216 is greater than the length of the second side surface 217, and spans the same distance as the second side surface 217 and the upper surface 215 combined. The first and second sides 216, 217 are longer in length than the tapered lower surfaces 218. The bottom surface 220 is longer in length than the top surface 219. The tapered lower surfaces 218 may have substantially the same length.

Fluid flowing into the filter assembly 200 identified by reference arrow "A" is funneled into the spaces 207 and against the first side surface 216 by the tapered upper surface 215 formed by the adjacent second wire shape 208B. The fluid then flows through an elongated channel formed by opposing first and second side surfaces 216, 217 on adjacent second wire shapes 208B. The elongated channel has substantially the same width along substantially the entire length of portions of the first and second side surfaces 216, 217 forming the elongated channel. The fluid flow then exits the spaces 207 through the diverging tapered lower surfaces 218 formed by adjacent second wire shapes 208B. Although the fluid identified by reference arrow "A" is illustrated as flowing into the spaces 207 from the top down, such as during production, the fluid flow may be reversed such that fluid flows in the opposite direction from the bottom up through the filter assembly 200, such as during water or steam injection.

The first and the second side surfaces 216, 217 have sufficient lengths to accommodate for erosion of the second wire shape 208B in the area where the upper surface 215 transition to the second surface 217 (as well as along the first side surface 216), while maintaining the elongated channel formed between opposing first and second side surfaces 216, 217 on adjacent second wire shapes 208B of sufficient length to prevent larger sized solid particles from flowing through the spaces 207. The increased height of the second wire shape 208B also increases the collapse and burst resistance of the filter assembly 200. Another advantage of the second wire shape 208B is that the upper surface 215 that funnels the fluid flow into the spaces 207 reduces impingement (e.g. less turbulence and bounce effect) of smaller sized solid particles on the side surfaces 216, 217 of the second wire shape 208B when flowing through the elongated channel formed by the side surfaces 216, 217 of adjacent second wire shapes 208B. A further advantage of the second wire shape 208B is that the flat top and bottom surfaces 219, 220 provide flat surfaces that enhance ease of weldability during the fabrication process.

Referring to FIG. 3C, the third wire shape 208C includes a substantially horizontal and flat top surface 221, a substantially horizontal and flat bottom surface 224, two tapered (e.g. curved or flat) lower surfaces 223 extending from the bottom surface 224, and two substantially vertical and flat side surfaces 222 disposed between the top surface 221 and the lower surfaces 223. The top surface 221 has a length greater than a length of the bottom surface 224. The side surfaces 222 may have substantially the same length, and are longer in length than the tapered lower surfaces 223. The lower surfaces 223 may have substantially the same length. The side surfaces 222 are disposed above the lower surfaces 223.

Fluid flowing into the filter assembly 200 identified by reference arrow "A" is channeled into the spaces 207 formed by adjacent third wire shapes 208C. The fluid then flows through an elongated channel formed by opposing side surfaces 222 on adjacent third wire shapes 208C. The elongated channel has substantially the same width along substantially the entire length of the opposing side surfaces 222. The fluid flow then exits the spaces 207 through the diverging tapered lower surfaces 223 formed by adjacent third wire shapes 208C. Although the fluid identified by reference arrow "A" is illustrated as flowing into the spaces 207 from the top down, such as during production, the fluid flow may be reversed such that fluid flows in the opposite direction from the bottom up through the filter assembly 200, such as during water or steam injection.

The side surfaces 212 have sufficient lengths to accommodate for erosion of the third wire shape 208C in the area where the top surface 221 transitions to the side surfaces 222 (as well as in the area where the lower surfaces 223 transition to the side surfaces 222), while maintaining the elongated channel formed between opposing side surfaces 222 on adjacent third wire shapes 208C of sufficient length to prevent larger sized solid particles from flowing through the spaces 207. The increased height of the third wire shape 208C also increases the collapse and burst resistance of the filter assembly 200. Another advantage of the third wire shapes 208C is that the top surfaces 221 reduce impingement (e.g. less turbulence and bounce effect) of smaller sized solid particles on the side surfaces 222 of the third wire shape 208C when flowing through the elongated channel formed by the side surfaces 222 of adjacent third wire shapes 208C. A further advantage of the third wire shape 208C is that the flat top and bottom surfaces 221, 224 provide flat surfaces that enhance ease of weldability during the fabrication process.

In one embodiment, the first, second, and/or third wire shapes 208A, 208B, 208C and/or support members 206 are partially or completely subjected to an erosion resistant treatment to further enhance erosion resistance of the filter assembly 200. The erosion resistant treatment may include increasing the hardness of a portion or all of the first, second, and/or third wire shapes 208A, 208B, 208C and/or support members 206 to having a hardness greater than about 1000 on the Vickers hardness scale. The erosion resistant treatment may include coating a part or substantially all of the first, second, and/or third wire shapes 208A, 208B, 208C and/or support members 206 with an erosion resistant coating, such as a diamond coating. The erosion resistant treatment may include applying the erosion resistant coating to a part or substantially all of the first, second, and/or third wire shapes 208A, 208B, 208C and/or support members 206 using a chemical vapor deposition process. The erosion resistant treatment may include kolsterising (e.g. surface hardening) a part or substantially all of the first, second, and/or third wire shapes 208A, 208B, 208C and/or support members 206 to increase hardness.

In one embodiment, the filter assembly 200 may include two sets of wire 208 forming a double layered filter assembly. For example, a second layer of support members 206 and wire shapes 208A, 208B, 208C can be disposed on (e.g. welded to) the top surfaces of the wire shapes 208A, 208B, 208C illustrated in FIG. 3A, FIG. 3B, and FIG. 3C. In addition, the double layered filter assembly can be pre-packed with an additional filter material disposed between the two sets of wire 208, such as large ceramic sand particles that do not fit through the spaces 207 of the filter assembly 200.

Figure 4:
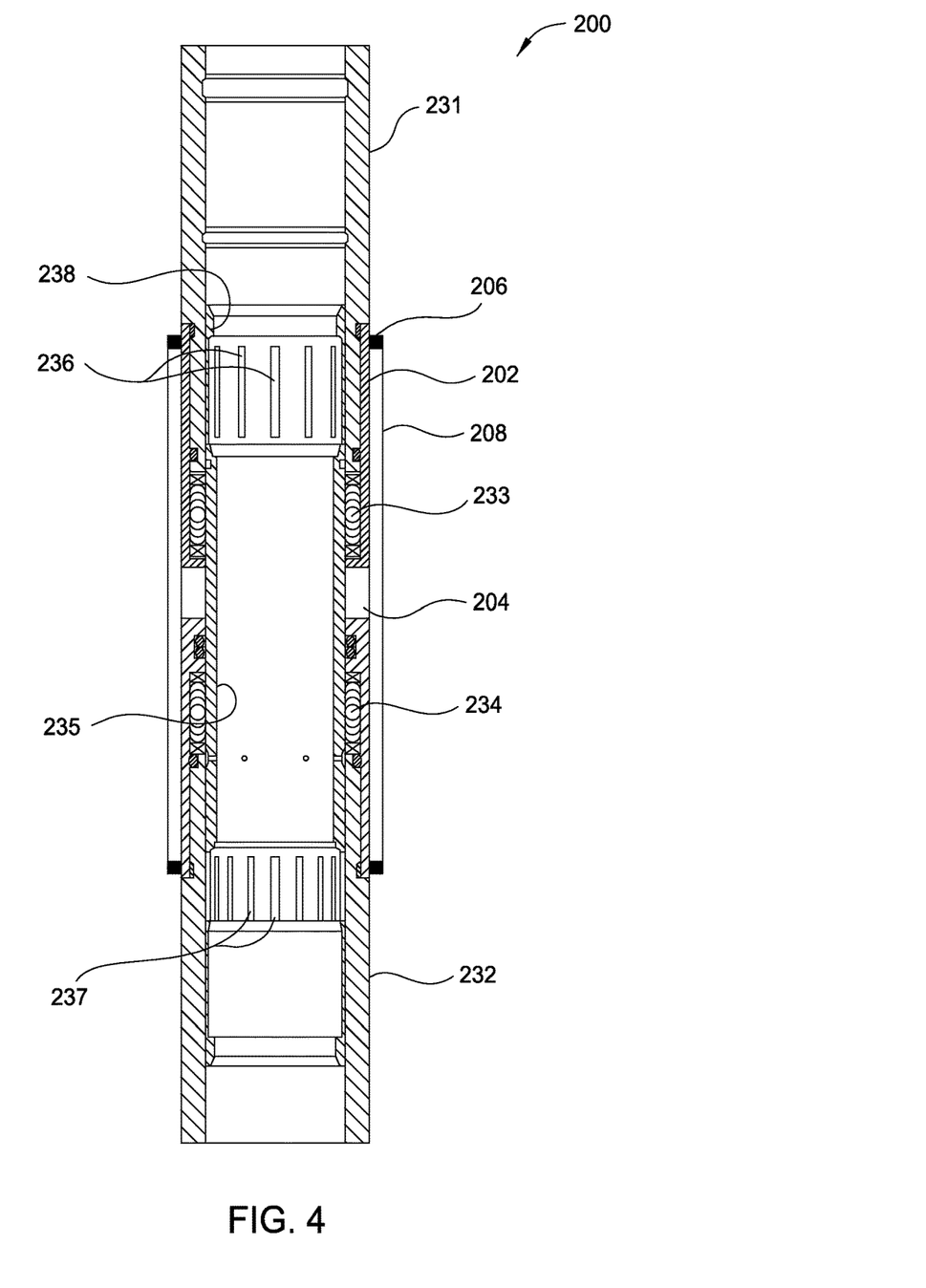
FIG. 4 illustrates a sectional view of the filter assembly, according to one embodiment disclosed herein.

FIG. 4 illustrates a sectional view of the filter assembly 200, according to one embodiment disclosed herein. The filter assembly 200 includes an upper mandrel 231 and a lower mandrel 232, each having flow bores in fluid communication with the work string 110 and/or the first and second sealing members 130, 140 (shown in FIG. 1). The tubular member 202 includes one or more openings 204, and is coupled to and disposed between the upper and lower mandrels 231, 232. One or more support members 206 are coupled to the outer surface of the tubular member 202, which support members 206 support the wire 208 for filtering out fluid that flows into the openings 204.

A first seal assembly 233 is disposed between the upper mandrel 231 and the tubular member 202. A second seal assembly 234 is disposed between the lower mandrel 232 and the tubular member 202. A sleeve member 235 having one or more openings 236, 237, such as circumferentially spaced slots, is disposed within the upper mandrel 231, the tubular member 202, and the lower mandrel 232. The first and second seal assemblies 233, 234 prevent fluid that flows through the spaces between adjacent sections of the wire 208 and the openings 204 in the tubular member 202 from flowing into the openings 236, 237 when the sleeve member 235 is in the position illustrated in FIG. 4.

A tool may be lowered into engagement with a profile 238 of the sleeve member 235 to move the sleeve member 235 axially (upward or downward) relative to the tubular member 202. The sleeve member 235 can be moved to a position where the openings 236 or 237 are positioned between the first and second seal assemblies 233, 234 to open fluid communication between the openings 236 or 237 of the sleeve member 235 and the openings 204 in the tubular member 202. In this manner, the filter assembly 200 can be selectively opened and closed as desired to conduct various wellbore operations, such as to start and stop the filtering and recovering of fluids from the reservoir 145.

While the foregoing is directed to certain embodiments, other and further embodiments may be devised without departing from the basic scope thereof, and the scope thereof is determined by the claims that follow.

We claim:

1. A filter assembly, comprising:
   a tubular member;
   one or more support members disposed on the tubular member; and
   a wire wound around the support members and having a plurality of turns, wherein one or more spaces are formed between adjacent turns of the wire; and
   wherein the wire includes a wire shape having substantially flat side surfaces such that an elongated channel having substantially the same width along substantially the entire length of the substantially flat side surfaces is formed between adjacent wire shapes of adjacent wire turns, wherein the wire shape includes two tapered lower surfaces such that adjacent wire shapes of adjacent wire turns form a lower funnel shape transitioning out of the elongated channel, wherein the wire shape includes at least one tapered upper surface such that adjacent wire shapes of adjacent wire turns form an upper funnel shape transitioning into the elongated channel, and wherein one of the substantially flat side surfaces of the wire shape has a length greater than a length of an other side surface.

2. The assembly of claim 1, wherein the wire shape further includes two tapered upper surfaces such that adjacent wire shapes of adjacent wire turns form the upper funnel shape transitioning into the elongated channel.

3. The assembly of claim 2, wherein substantially flat side surfaces are longer in length than the upper and lower surfaces.

4. The assembly of claim 3, wherein the wire shape further includes a substantially flat top surface and a substantially flat bottom surface.

5. The assembly of claim 2, wherein the upper funnel shape transitioning into the elongated channel is formed by the converging of the two tapered upper surfaces.

6. The assembly of claim 1, wherein the wire shape further includes only one tapered upper surface.

7. The assembly of claim 6, wherein the wire shape further includes a substantially flat top surface and a substantially flat bottom surface.

8. The assembly of claim 7, wherein the substantially flat bottom surface has a length greater than a length of the substantially flat top surface.

9. The assembly of claim 1, wherein a part or substantially all of the one or more support members and/or the wire are coated with an erosion resistant coating or are surface hardened to increase hardness.

10. The assembly of claim 1, further comprising a sleeve member having one or more openings that is disposed within the tubular member, wherein the sleeve member is moveable between a closed position where the openings of the sleeve member are not in fluid communication with one or more openings in the tubular member and an open position where the openings of the sleeve member are in fluid communication with the openings of the tubular member.

11. The assembly of claim 1, wherein the substantially flat side surfaces of the adjacent wire shapes of adjacent wire turns forming the elongated channel are substantially parallel vertical surfaces.

12. The assembly of claim 1, wherein the elongated channel is substantially perpendicular to the support members.

13. The assembly of claim 1, wherein the substantially flat side surfaces are disposed between the at least one tapered upper surface and one of the tapered lower surfaces.

14. The assembly of claim 1, wherein the substantially flat side surfaces are substantially perpendicular to the support members.

15. The assembly of claim 1, wherein the lower funnel shape transitioning out of the elongated channel is formed by the diverging of the two tapered lower surfaces of the adjacent wire shapes of adjacent wire turns.

16. The assembly of claim 1, wherein the wire is welded to the one or more support members.

17. The assembly of claim 1, wherein the wire is partially or completely subjected to an erosion resistant treatment.

18. The assembly of claim 17, wherein the erosion resistant treatment includes surface hardening.

19. The assembly of claim 1, wherein the one or more support members are partially or completely subjected to an erosion resistant treatment.

20. The assembly of claim 1, wherein the wire is a first wire, and wherein a second wire having a same wire shape as the first wire is wrapped around the first wire.

* * * * *